United States Patent
Groll et al.

(10) Patent No.: US 7,142,943 B2
(45) Date of Patent: Nov. 28, 2006

(54) METHOD AND APPARATUS FOR CONTROLLING A PLANT

(75) Inventors: Franz Groll, Ravensburg (DE); Jürgen Bäumer, Markdorf (DE)

(73) Assignee: Kuka Roboter GmbH (DE)

( * ) Notice: Subject to any disclaimer, the term of this patent is extended or adjusted under 35 U.S.C. 154(b) by 546 days.

(21) Appl. No.: 10/625,211

(22) Filed: Jul. 22, 2003

(65) Prior Publication Data

US 2004/0128027 A1    Jul. 1, 2004

(30) Foreign Application Priority Data

Jul. 24, 2002    (DE)    ................ 102 33 553

(51) Int. Cl.
*G06F 19/00*    (2006.01)
(52) U.S. Cl. ............................ 700/169
(58) Field of Classification Search ............ 700/2, 700/96, 169
See application file for complete search history.

(56) References Cited

U.S. PATENT DOCUMENTS 5,535,406 A * 7/1996 Kolchinsky ............... 712/10
5,771,374 A   6/1998 Burshtein et al. .......... 713/502
6,556,950 B1 * 4/2003 Schwenke et al. ......... 702/183

FOREIGN PATENT DOCUMENTS

| DE | 42 15 380 | 11/1993 |
| DE | 195 43 826.4 | 11/1995 |
| DE | 694 14 392 | 6/1999 |
| JP | 58178408 | 10/1983 |

* cited by examiner

*Primary Examiner*—Albert W. Paladini
*Assistant Examiner*—Chad Rapp
(74) *Attorney, Agent, or Firm*—McGlew & Tuttle, PC (57) ABSTRACT

A method for controlling a plant, such as an industrial production plant with a plurality of working units, such as industrial robots or the like, using at least one programmable logic control (PLC), is characterized in that historical process data are fed into an input area of the PLC and processed by a PLC program logic. An apparatus suitable for performing the method according to the invention has a real time information server for acquiring, archiving or transferring in each case specific historical process data with respect to the plant and a data stream controller for the flexible transfer of archived process data to at least one programmable logic control PLC for controlling the plant, wherein the output data of the PLC can be fed back into the latter.

30 Claims, 9 Drawing Sheets

METHOD AND APPARATUS FOR CONTROLLING A PLANT

FIELD OF THE INVENTION

The invention relates to a method for controlling a plant, such as an industrial production plant having a plurality of working units, such as industrial robots or the like, using at least one programmable logic control (PLC), as well as an apparatus for fault finding, optimizing, simulating and information exchange in electronically controlled plants, such as industrial production plants with a plurality of working units.

BACKGROUND OF THE INVENTION

Programmable logic controls (PLCs), where control programs are placed in a program memory as a sequence of instructions, are regularly used in automation technology as plant and operation centre controls. A PLC can have a control device solely intended for control purposes, which can be adapted to specific control functions by reading a specific control program into the program memory. Alternatively PLCs can also be implemented with a universal computer, such as a standard personal computer, on which runs the corresponding control program (soft PLC), which leads to a cost savings due to the omission of specific hardware components. In addition, when using a soft PLC more flexible program logics can be programmed, so that the use of soft PLCs in many sectors of automation technology nowadays constitutes a standard with which in a cost-effective, efficient manner it is possible to implement a flexible control of complex plants and the possibility of providing a comfortable operating surface compared with a conventional PLC contributing to this.

However, more particularly in complex, multilayer automation processes, the use of flexible programmable logic controls gives rise to various technical problems, e.g. in connection with fault finding in the actual plant and also in the PLC program, in the optimization of production sequences and in conjunction with subsequent, flexible interrogations (characteristic data generation for testing or training purposes), which are not or are only inadequately solved in the known PLC-controlled plants.

On the basis of the above-described, prior art problems and disadvantages, the problem of the invention is to further develop an electronic plant control method and apparatus in such a way that they can be flexibly used for process analysis, plant simulation, fault finding and optimization, as well as for training purposes and preventative plant maintenance.

SUMMARY OF THE INVENTION

In the case of a method of the aforementioned type, this problem is solved in that historical process data are fed into the PLC and processed by a PLC program logic. The term historical process data or historical data for short is understood to mean stored data, no matter whether from an actual earlier process run-through or which have been artificially created, which are so read and processed by the PLC in the same way as if they had come directly from the plant periphery, e.g. a field bus linking the different actuators and sensors of a plant.

With regards to an apparatus of the aforementioned type, the problem is solved in that it is provided with a real time information server for acquiring, archiving or passing on in each case specific, historical process data of the plant and a data stream controller for the flexible transfer of archived process data to at least one programmable logic control (PLC) for controlling the plant, whose raw data can again be fed into the PLC.

The soft PLC processes the data, including the historical data, corresponding to its program logic and as a result of the dependence implemented according to the invention is subsequently able to perform specific process sequences for analysis, optimization or training purposes.

According to a further development of the invention, prior to feeding into the soft PLC, the process data are filed and archived in a real time data bank. This allows a processing of process data both in online operation in real time and subsequently in offline operation.

According to a preferred variant of the method according to the invention, during the filing a data compression and/or time coding takes place.

According to a preferred further development of the method according to the invention, feeding-in takes place in cycle-precise manner with respect to a PLC processing cycle. Cycle-precise feeding-in means that the feeding of historical data into the PLC takes place in time coordination with the PLC processing cycle. There is preferably a cyclic and/or feed-synchronous processing of the process data by the PLC. In this connection it is also possible for the process data stream to the PLC to be controlled by means of a data stream controller with respect to the data quantity, data rate, time quantity or the like. Preferably the data stream controller is constructed for time-precise location, for time forward and backward reproduction, for accelerated and decelerated and for quantity-flexible reproduction of historical process data. The above-mentioned developments of the method and apparatus according to the invention permit a flexible, subsequent running of process sequences, e.g. with a different speed or detail level for fault finding or training purposes. The time process sequence is randomly scalable and controllable through the data stream controller.

According to a further development of the method according to the invention, the process data are fed in online or offline. As preferably results of the processing are provided in an output area of the PLC, through cascading connection of its input area with its output area, optionally via further data stream control devices, the PLC can operate in a quasi-autarchic manner, i.e. functions as a virtual machine (VM). In this way the real PLC control according to the invention can also be used independently in the case of non-invasive plant binding, which leads to decisive cost advantages, specially in the optimization and training sector.

According to a further development of the invention, the process data are generated at at least one field bus of the plant, the historical process data being organized in a shift register in the order of their generation and can at any time be read and processed by an analyzer. For this purpose the historical process data are preferably provided during their generation with a time marker.

The analyzer can e.g. be constructed as a visualization unit for optical process data analysis, so that process sequence monitoring is possible at any time, both online and offline.

A field bus is understood to mean a serial and digital transmission system used for process control and monitoring and which is designed with a bus structure. The large number of elements (sensors, actuators) used in automated production, which can also be called a field and which must be interrogated or polled at specific time intervals, requires a complex communication structure between the elements and the central control. Said structure is implemented in bus form. Through the generation of the historical process data directly at at least one field bus of the plant, it is possible to bring about a flexible, decentralized generation of process data, so that the system capacities of the central control (soft PLC) are protected.

According to a further development of the invention, specific process data forwarded from the real time information server are available for other applications as a real time data stream or in standardized form as an object linking and embedding (OLE) for process control or analysis. Thus, in addition to the dependence function according to the invention, there is also a forwarding of process data, e.g. for control purposes or in conjunction with an OPC client (OPC: OLE for process control) and a human-machine interface (HMI).

According to a preferred development of the invention, the apparatus also has at least one data acquisition unit in the plant field bus system. The data acquisition unit is preferably constructed for buffer storage of the input/output data (I/O data) transmitted in the field bus and according to a particularly preferred development of the invention is connected by means of a local area network (LAN) to the real time information server.

A data acquisition unit allows a passive monitoring at the plant field bus system. It "sees" all the I/O data of the I/O modules of the field bus (field bus modules), transmitted during a cycle of the field bus system, stores the same in a shift register and transfers the information to a real time information server. Such an architecture allows the coupling of several data acquisition units to one and the same real time information server, which leads to a simplified network structure. The LAN connection according to the invention between the field bus and the master control software, e.g. using the ethernet protocol, creates a standardized transmission path between the control and the plant to be controlled, which has a favourable effect on structural and maintenance costs, as well as on maintenance effort.

According to a particularly preferred development of the method according to the invention, historical process data and actual process data are combined for feeding into the PLC. Thus, further developments according to the invention can be flexibly combined with existing advantages of known plant controls, so as in this way to implement in process-dependent manner an optimum control concept.

According to a preferred development, at least two programmable logic controls form a virtual machine by cascading connection of their input areas with their output areas, optionally via further data stream control devices.

Furthermore, at least the PLC and/or the real time information server are constructed as PC software components. This leads to a compact, central control apparatus, which is cost-effectively based on standard technologies.

BRIEF DESCRIPTION OF THE DRAWINGS

Further details and advantages of the invention can be gathered from the following description of embodiments with reference to the attached drawings, wherein show:

FIG. 1A block diagram of a plant to be monitored and a control according to the invention.

FIG. 2A model-based description of the fundamental principle of the control method according to the invention.

FIG. 3A block diagram of the control apparatus according to the invention.

FIG. 4A block diagram of a real time information server according to the invention.

FIG. 5A block diagram of a data acquisition unit according to the invention.

FIG. 6A flow chart of the use of two control apparatuses according to the invention for simulation purposes.

FIG. 7A flow chart of the use of the inventive method or control apparatus for optimization purposes.

FIG. 8A block diagram of a mixed form of the control apparatus according to the invention.

FIG. 9A block diagram according to a controlled system according to the invention for illustrating information compression.

DETAILED DESCRIPTION OF THE DRAWINGS

Figure 1:
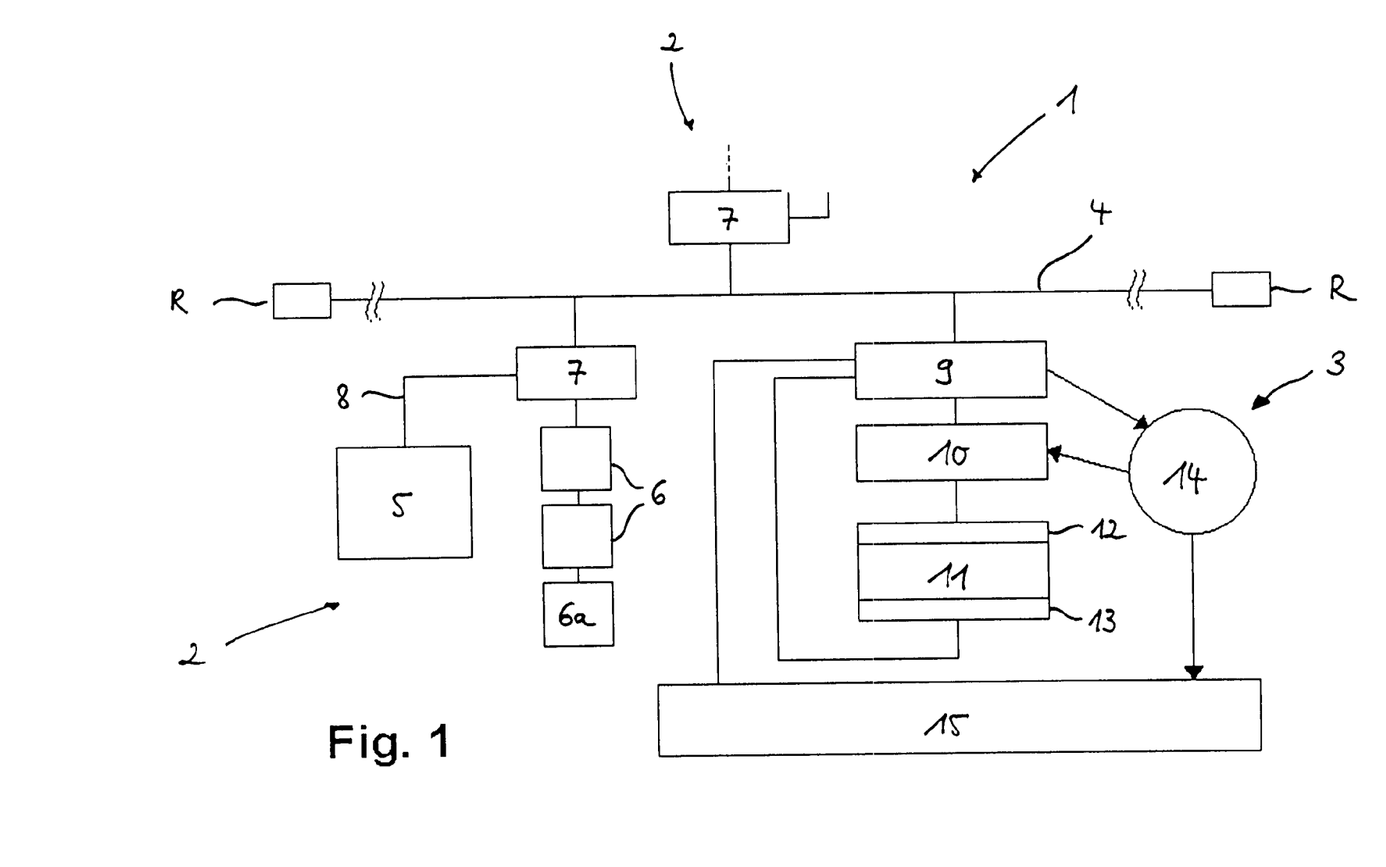

FIG. 1 shows in a block diagram a plant 1 to be controlled having a plurality of fields 2 and a plant control 3, interlinked by a bus system 4 for data and information exchange.

The fields 2, whereof only one is expressly shown in FIG. 1 so as not to overburden the latter, have working units 5 characteristic to the essence of the plant 1, such as in particular handling systems in the form of industrial robots, together with machines, driven equipment, such as welding tongs, etc. In addition, the plant 1 has a plurality of field bus modules 6, at least one field bus control 6a and a data acquisition unit 7, which are in turn interconnected by a subbus system 8 (field bus). The field buses 8 are connected to the bus system 4 with terminating resistances R. The field bus control 6a is preferably constructed as a programmable logic control (PLC).

The plant control 3 comprises a real time information server 9, a data stream controller 10 and a programmable logic control 11, the latter having input and output areas 12, 13 respectively. The real time information server 9 and data stream controller 10 communicate with a real time data bank 14. The plant control 3 is connected to the bus system 4 via the real time information server 9. The data stream controller 10 is connected downstream of the real time information server 9, which is connected to the input area 12 of the programmable logic control 11. The output area 13 of the programmable logic control 11 is connected to the real time information server 9, so that components 9 to 13 of the plant control 3 form a closed control loop.

Over and beyond the aforementioned components, the plant 1 has peripherals 15, e.g. visualization devices or the like, which are directly connected to the real time information server 9 of the plant control 3. In accordance with the embodiment shown, the peripherals 15 can also access the real time data bank 14.

The operating unit 5, e.g. an industrial robot, for controlling its periphery (actuators, sensors; not shown in detail here), makes use of the field bus 8, i.e. a serial and digital transmission system with a bus structure, by means of which the large number of peripheral elements used (fields 2) are interrogated by the field bus control 6a at specific time intervals. For this purpose each field 2 of the plant 1 has the I/O modules (field bus modules) 6 diagrammatically represented in FIG. 1 and through which the field data are communicated across the field bus 8. The data acquisition unit 7 allows a passive reading of all the I/O data of the field bus modules 6 and is shown in greater detail in FIG. 5.

The data acquisition unit 7 transfers the data of field 2 to the plant control 3 by means of the bus system 4 in a data stream format adapted to the requirements of the plant control 3. The bus system 4 is constructed as a local area network (LAN) and preferably uses an ethernet protocol for data transmission. Data transmission from the data acquisition devices 7 to the plant control 3 generally takes place asynchronously, i.e. it is not synchronized with the control cycles of the operating units 5.

The field bus modules 6 are standard digital or analog input and output modules, which are connected to a central field bus master (PC plug-in card or embedded hardware; not shown). On the program logic side, the entire field bus 8 is controlled by the field bus PLC 6a. Preferably both the field bus PLC 6a and the PLC 11 of the plant control 3 are constructed as software-based programmable logic controls (soft PLCs) and can be run on a PC.

Field bus data arriving at the plant control real time information server 9 are either archived after corresponding processing as historical process data (historical data) in the form of RAD (real time archived data) sets in the real time data bank 14 or are directly transferred to the data stream controller 10. The operation of the real time information server 9 is explained in greater detail hereinafter relative to FIG. 4.

The data stream controller 10 mainly serves to supply the PLC 11 with historical data from the real time data bank 14. In much the same way as the playback function of a video recorder, the data stream controller 10 supplies the process data stream to the PLC input area 12 and in this connection allows a precise positioning within the data stream, rapid forward or return run, slow motions, single data steps or the like, use being made of time marking of the historical data. The programmed logic of the PLC 11 then decides regarding the intention and result of the data processing and makes the result in the output area 13 of the PLC 11 again available to the real time information server 9, so that for plant control 3 according to the invention the possibility exists of dependence on itself and therefore construction as a virtual machine (VM).

Besides the data stream controller 10, optionally further peripherals 15, such as visualization or alarm devices, can access the historical data in the real time data bank 14. However, specific process data, as shown in FIG. 1, prior to archiving in the real time data bank 14 can be directly transferred by the real time information server 9 to specific peripherals 15.

Figure 2:
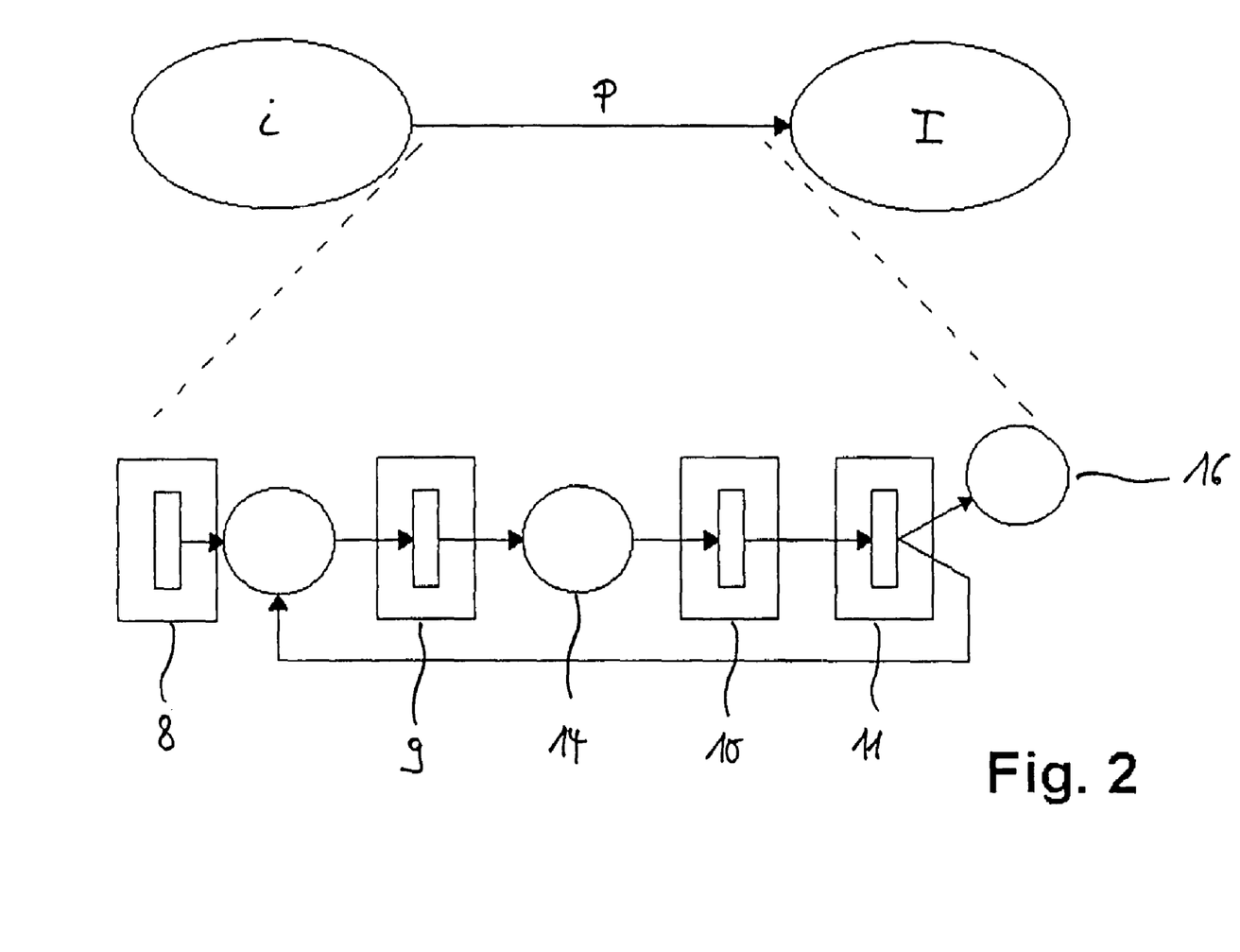

FIG. 2 diagrammatically illustrates the fundamental principle of the inventive control method, which comprises a compression of relatively simple information i in the form of real process data of a plant to complex information I, e.g. in the form of compressed plant characteristics. The method sequence P is shown in detail in the lower part of FIG. 2 by means of a Petri net.

Real process data with a limited information content i are generated in the field bus 8 (cf. FIG. 1) and transferred to the real time information server 9, where as a rule there is a processing of the process data (time coding, data compression, etc.). The process data are then filed as historical data in the real time data bank 14. The data stream controller 10 reads historical data from the real time data bank 14 and, as a function of the selected reproduction mode, makes same available to the programmable logic control 11. The output or raw data of the PLC 11 are then again fed into the real time information server 9 or are available as compressed characteristics 16 with complex information content I for further processing purposes. The data stored in the real time data bank 14 and the characteristics 16 can fundamentally correspond to one another, depending on whether the PLC 11, within the scope of its control function, merely interprets or actively modifies the data.

Within the scope of a stepwise information compression, it is possible to file already compressed characteristic data 16 in a data bank 14. The resulting information pyramids are explained in greater detail relative to FIG. 9.

Figure 3:
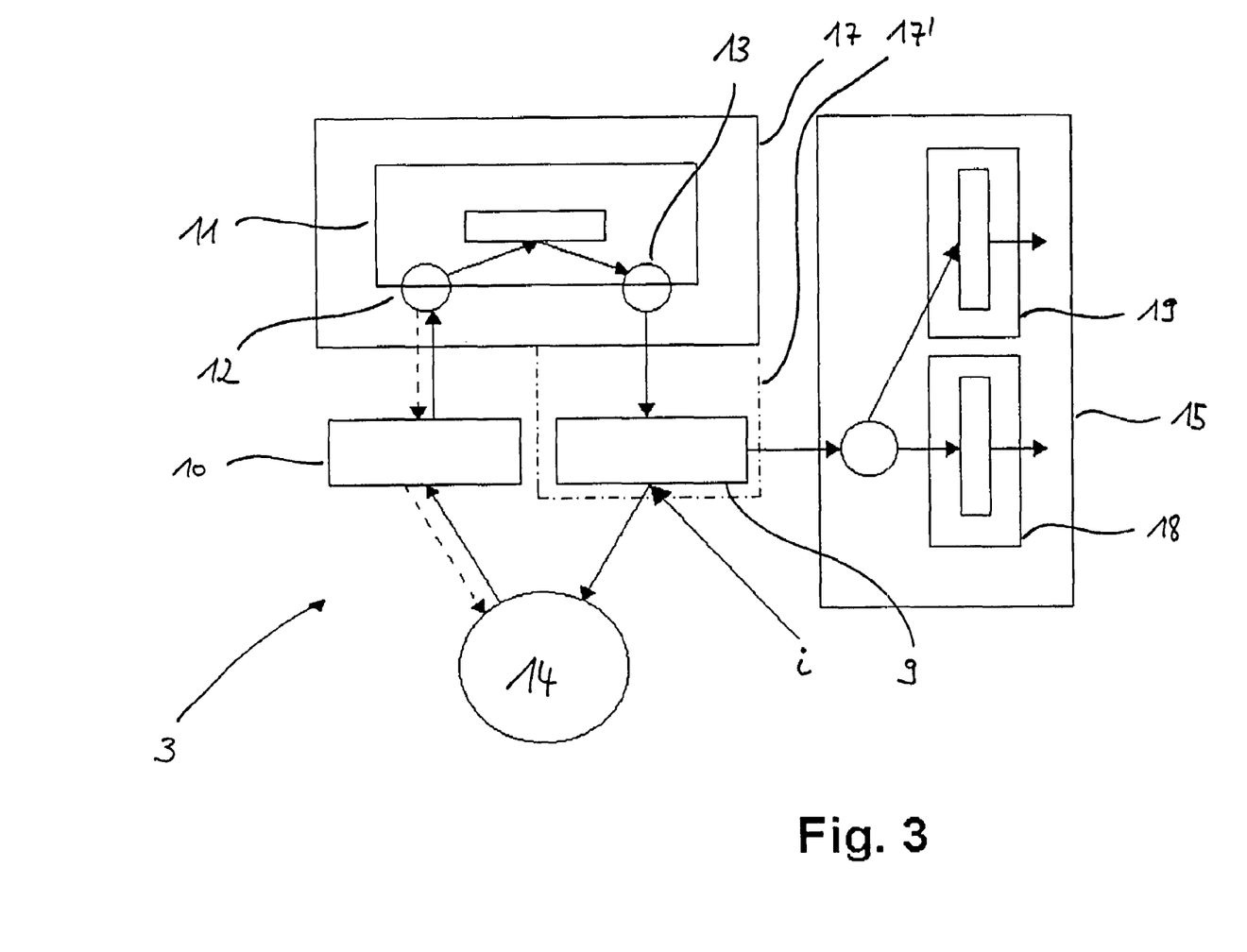

FIG. 3 diagrammatically shows the structure and data processing within the plant control 3 by means of a combined block diagram-flow chart.

Real process data from the field buses 8 of plant 1 pass in the form of simple information i (cf. FIG. 2) to the real time information server 9 of plant control 3. From there the data are forwarded directly to the peripheral 15 or archived in the real time data bank 14. The data are then read by the data stream controller 10, which transfers the process data, now in the form of historical data, in coordination with the control cycle of the PLC 11, to the input area 12. The thus defined writing in the input area (input map) of the PLC 11 can take place both as a pure read operation and also by a real time data bank with active write-read operation (indicated by continuous and broken line arrows in the left-hand part of FIG. 3).

The PLC 11 processes the data received for control purposes and writes in the output area 13 (output map). The data are returned from the output area of the PLC 11 to the real time information server 9, so that cascading takes place by linking an output area 13 with an input area 12.

In the embodiment of FIG. 3, the PLC 11 is constructed as a pure software module, i.e. as a software-based PLC (soft PLC) and can be run on a PC 17. However, it is also possible to operate further components of the plant control 3 on a common PC 17, 17', which is indicated in FIG. 3 by the dot-dash line, so that e.g. the PLC software component and a real time information server software component run on the same PC.

The control apparatus according to the invention is also in a position to transfer to peripheral 15 certain process data for direct processing purposes. For example, FIG. 3 shows a human-machine interface (HMI) 18 and an OPC server 19 (object linking and embedding OLE for process control).

FIG. 3 shows how the cascading according to the invention creates a control loop within the plant control 3 and which as a result of its dependence ensures that the inventive control apparatus can be operated as a virtual machine (VM) and therefore can be particularly advantageously used for optimization or training functions and the like.

Figure 4:
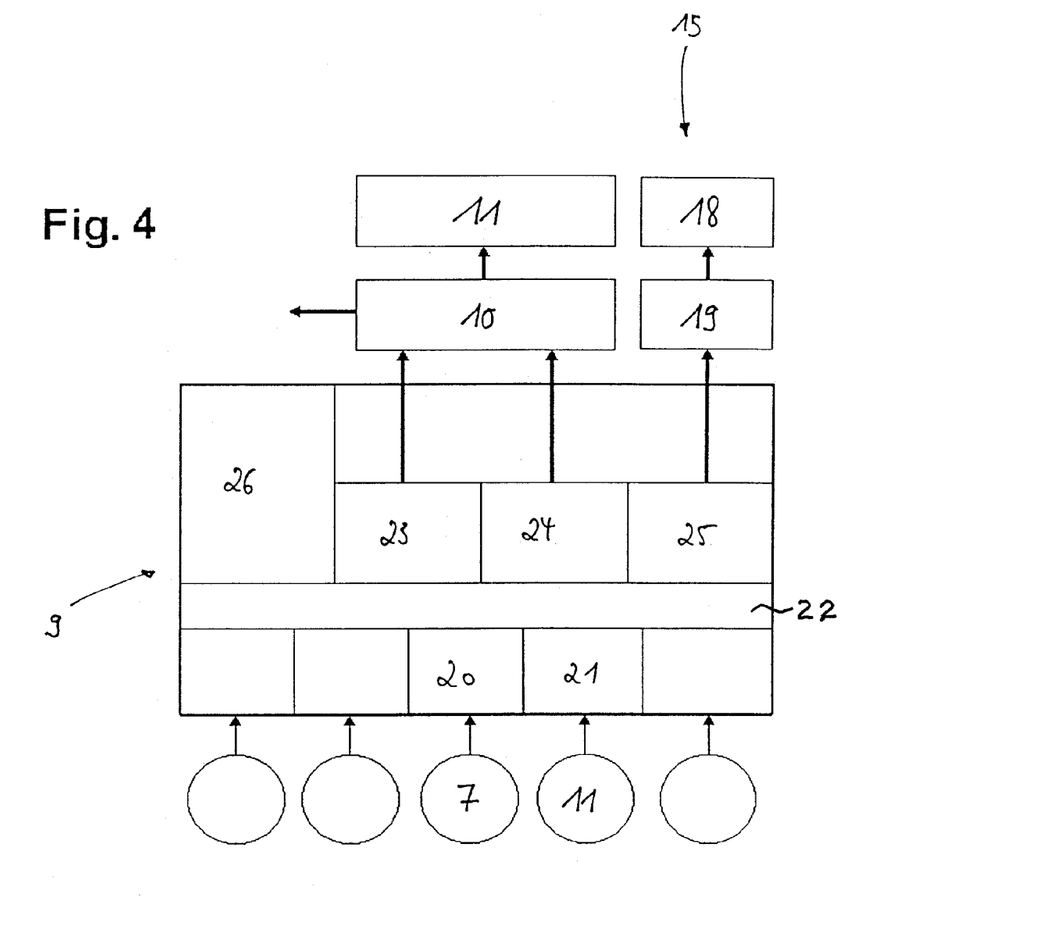

FIG. 4 shows the detailed structure of the real time information server 9. As the real time information server 9 is preferably constructed as a software component, also the subcomponents are correspondingly implemented as software components or modules.

The inventive real time information server 9 has on the input side various client programs, e.g. a RDS (real data streamer) client 20 and a read program for output data (from the output area 13 of PLC 11) 21.

The real time information server 9 also comprises an interpreter 22 and on the output side an archive file writing program 23, a RDS server 24 and an OPC server 25. The real time information server 9 also contains a data description file 26.

The data received on the input side from the external servers 7, 11 are processed by the internal clients 20, 21, optionally interpreted by interpreter 22 and then made available to the output-side servers 23, 24, 25. The function of interpreter 22 is to bring the data received into a format suitable for further processing by the corresponding client 23, 24, 25. The archive file writing program 23 generates data intended for archiving in the real time data bank 14 (not shown here). In the manner shown in FIGS. 1 to 3, the historical data pass to the PLC 11 via data bank 14 and data stream controller 10. The RDS server 24 generates a continuous stream of real time data, which are made directly available to the PLC 11 without prior archiving and in the embodiment shown here the data stream controller 10 can serve as an intermediate station between the real time information server 9 and PLC 11, also for the real time data stream. The OPC server 25 generates data in the form of OPC variables and makes them available to one or more external OPC clients 19, such as the HMI 18, e.g. for analysis purposes.

Thus, in general, the real time information server 9 with the aid of specific programs acquires the process data from different data sources, archives specific parts of said data in a real time data bank 14, preferably with a toroidal core store architecture (shift register, FIFO buffer) and, on request, makes said data available again for various applications, including the data stream controller 10.

The data description file 26 indicates in this connection which data are acquired with which programs and with which scanning, archived in the real time data bank 14 or forwarded directly for other applications, the latter being either as a real time data stream 24 to the data stream controller 10 or OPC variables 25 to the OPC client 19.

Figure 5:
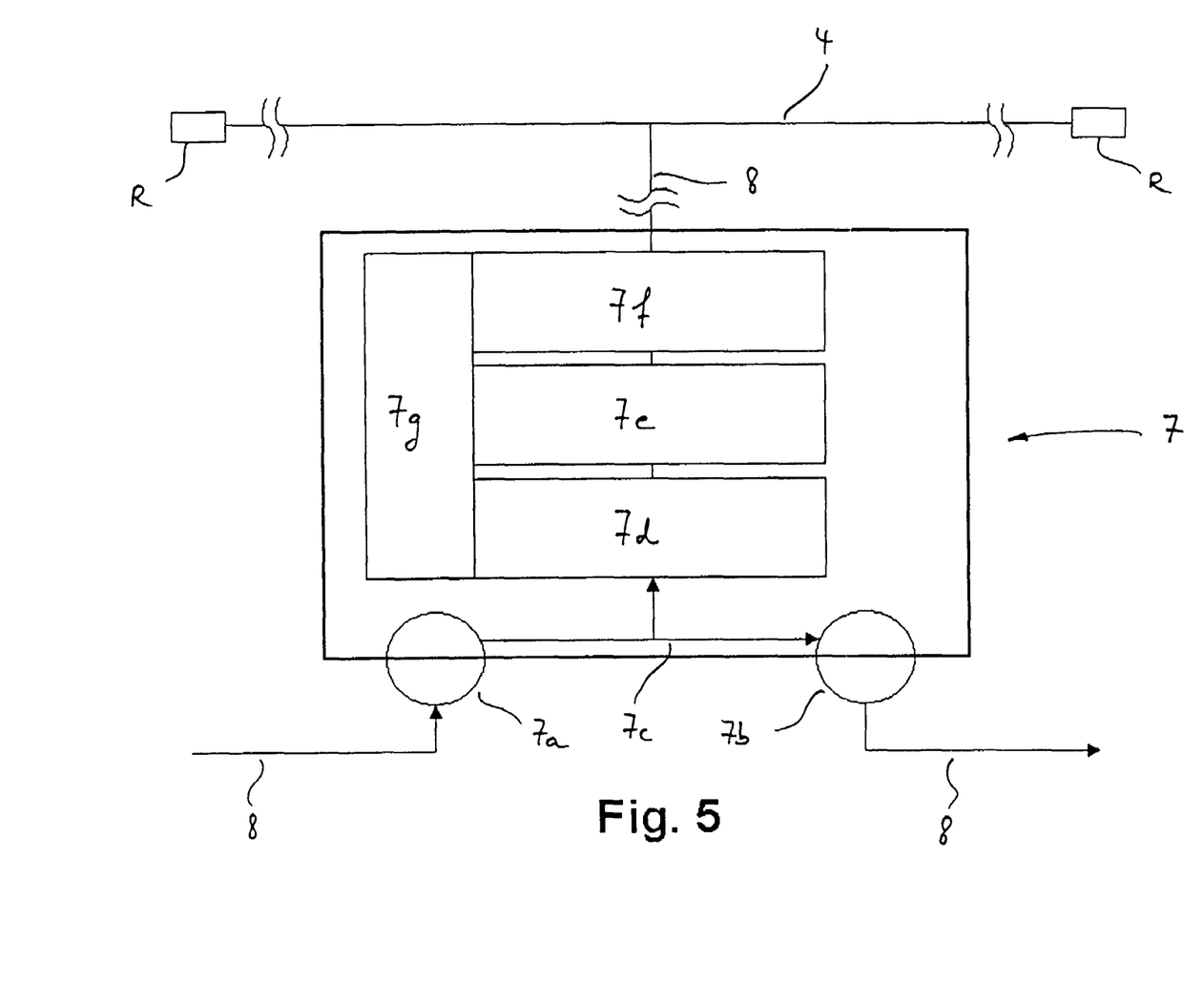

FIG. 5 is a block diagram of an embodiment of the data acquisition unit 7 within the field bus 8 (cf. FIG. 1). According to the invention, the data acquisition unit 7 is constructed for the passive reading of all I/O data from modules 6 within the field bus 8 (field bus modules). Besides a data input 7a and a data output 7b, which are internally interconnected by optocouplers 7c, it also has an interpreter 7d, a shift register 7e and a RDS server 7f, by means of which the unit 7 is connected to the bus system 4 of plant 1 by a ethernet connection. The data acquisition unit 7 also comprises a data description file 7g, whose entries are decisive for data treatment by the software components 7d and 7f.

The data acquisition unit 7 according to the invention processes and feeds into the bus system 4 of plant 1 field bus data and also passes them directly from the data input 7a to the data output 7b, so that they are available unchanged within the field 2 of the operating unit 4 or the field bus control 6a.

Figure 6:
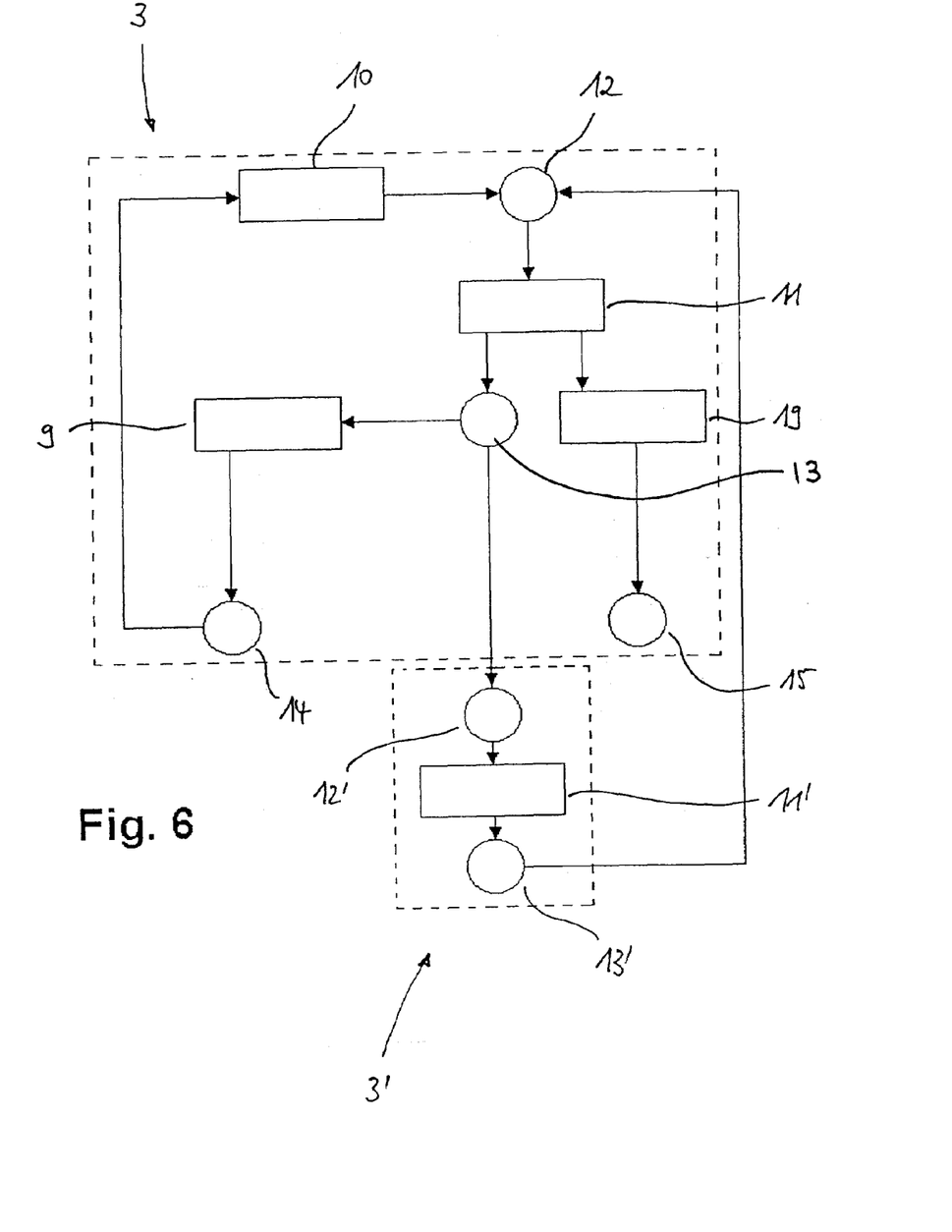

FIG. 6 shows the method sequence when using two control apparatuses according to the invention in the case of a control simulation with the aid of a Petri net representation.

For control simulation purposes in the embodiment shown, two inventive plant controls 3, 3', as described hereinbefore, are connected in series and to simplify the representation of the control 3', only the PLC 11' with its input and output areas 12', 13', respectively, are shown. Since when using the method according to the invention, the control program of the PLCs 11, 11' can also take place without direct plant binding, the PLCs 11, 11' can also be referred to as virtual machines with programmable logic control (programmable logic control-virtual machine PLC-VM).

The control 3 shown in FIG. 6 essentially corresponds to the controls 3, described in detail hereinbefore relative to FIGS. 1 and 3. However, during the control simulation, the output area 13 of the PLC-VM 11 is connected not only to the real time information server 9, but additionally to the input area 12' of a further PLC-VM 11', whose output area 13' is connected to the input area 12 of the first PLC-VM 11.

In order to simulate the behaviour of the plant control according to the invention, e.g. for training purposes and without plant binding, in the embodiment of FIG. 6, the control 3' with the program logic of its PLC-VM 11' is constructed for generating simulated actuator-sensor process data, which it makes available via its output map 13' to the input area 12 of the PLC-VM 11, optionally in conjunction with historical data fed in via a data stream controller 10. As the inventive control apparatuses 3, 3' are regularly constructed for reading their own output areas 13, 13' during the sought cascading, they can be readily used for such control simulations, i.e. without major program changes. In addition, the regularly generated historical data archived in the data bank 4 can be used offline, i.e. in time-independent manner, for simulation purposes.

As a result of the indicated offline capacity and the control simulation illustrated by FIG. 6, the method or control apparatus according to the invention are particularly suitable for optimizing PLC codes.

Figure 7:
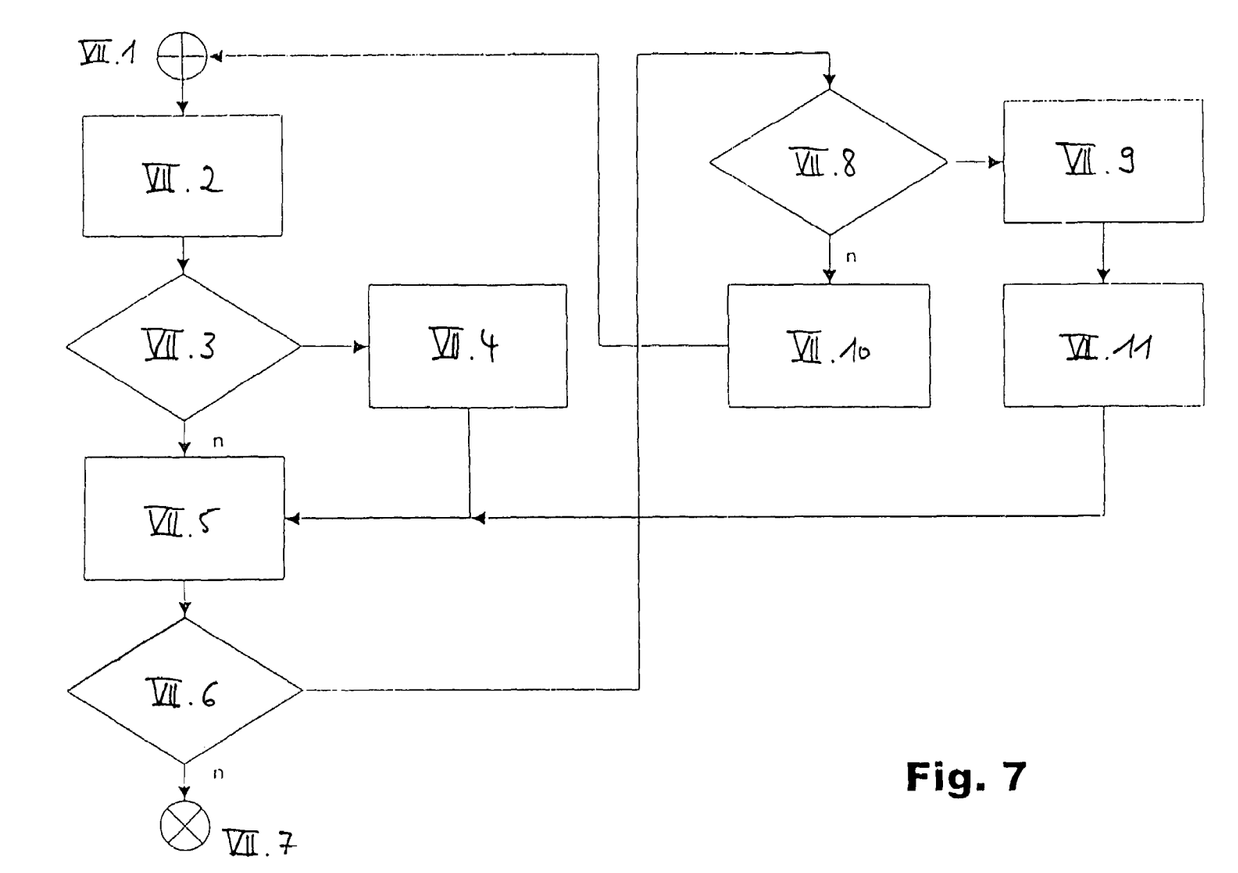

FIG. 7 is a flow chart of a code optimization cycle, as is made possible by the control method and apparatus according to the invention.

The cycle starts at VII.1 and then at VII.2 there is a recording of field bus data (sensor/actuator data, etc.). This is followed by an inquiry VII.3 as to whether an optimization is desired with simulation (j) or without simulation (n). An affirming of the inquiry VII.3 leads to a calculation of a reference file VII.4 and then at VII.5, as also occurs in the case of a negated inquiry VII.3, there is a critical path analysis or CPA with the aim of finding critical paths within the process to be optimized, for which a given process duration $T_{actual}$ exceeds a predetermined maximum duration $T_{max}$. The CPA method is a per se known method for time planning and optimization of complex business, organizational or working processes, in which by drawing up specific arrow diagrams the time-intensive path essential for the entire process duration is determined as a sequence of individual process steps. Thus, a CPA provides information as to which method steps make it possible to bring about a time advantage for the overall process by improved organization, e.g. improved control.

Following on to CPA VII.5, at VII.6 there is an inquiry as to whether according to CPA there is or is not an optimization potential ($T_{actual} > T_{max}$). A negation of this inquiry ends the optimization cycle at VII.7.

However, if inquiry VII.6 is affirmed, there is a further inquiry at VII.8 as to whether there is to be an optimization with or without simulation. A negation of this inquiry leads directly to a modification of the program logic in plant VII.9 and then the optimization cycle can run again starting at VII.1.

However, if at VII.8 an optimization with simulation is desired, a program change takes place in accordance with the CPA in the simulation and not in the plant itself (cf. FIG. 6). Then, at VII.11 a new reference file for the plant is calculated. The cycle is then continued at VII.5 with a new CPA.

The aforementioned reference file VII.4 or VII.11 parametrizes the state of the plant to be simulated or optimized and consequently constitutes the link between reality and simulation. Preferably a real, existing plant is clearly defined with respect to simulation by its reference file. Moreover, from a simulated reference file, clear conclusions can be drawn concerning the real plant or the program logic controlling it.

The invention is not limited to the hitherto exemplified-described method sequences or control apparatuses. Within the scope of the invention, it is more particularly possible to implement different mixed forms of the inventive control method with other, per se known PLC control methods.

Figure 8:
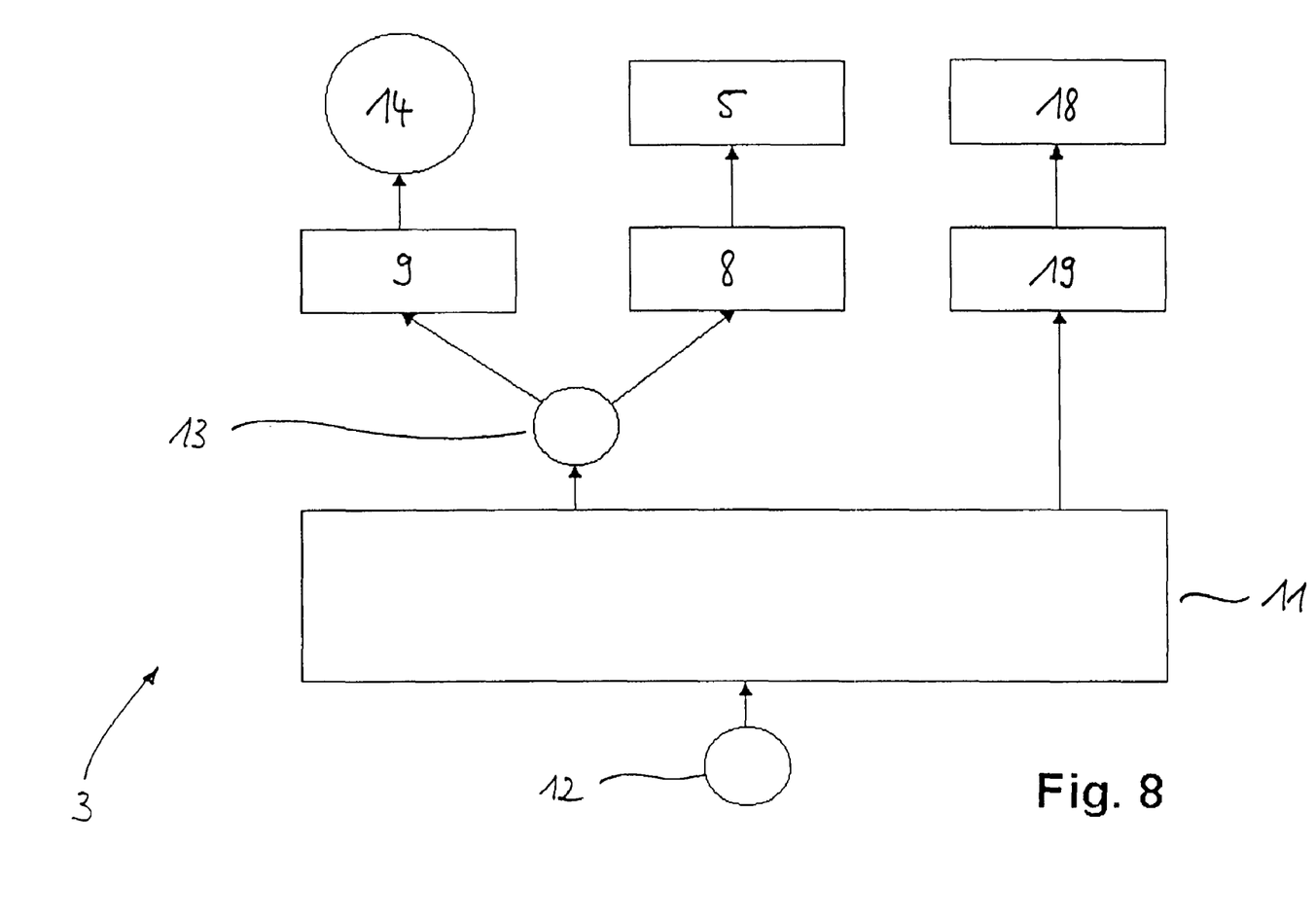

Such a mixed form is diagrammatically shown in FIG. 8.

The plant control 3 has a PLC-VM 11 with input and output areas 12, 13 respectively. According to the invention, the data in the output area 13 are again made available to a real time information server 9 and real time data bank 14. In addition, the raw or output data from the output area 13 can be directly passed via a field bus 8 for active control to an operating unit 5 of the plant, such as a robot, or to actuators or sensors thereof. In parallel, the PLC-VM 11 transfers data directly to an OPC server 25, which in the embodiment shown is connected to a HMI 18 for visualization purposes.

Thus, the known possibilities of plant control by PLC are combined with the advantages of the invention.

The inventive archiving of historical process data (historical data) in real time data banks 14 is not limited to real process data. In addition, archiving can be carried out during cascading by dependence for compressed characteristic data 16, i.e. complex information I according to FIG. 2. Archiving in RAD files takes place for real process data in the same way as for compressed characteristic data 16. This makes it possible to perform fault finding, process optimization or employee training on virtually any random level of control.

Figure 9:
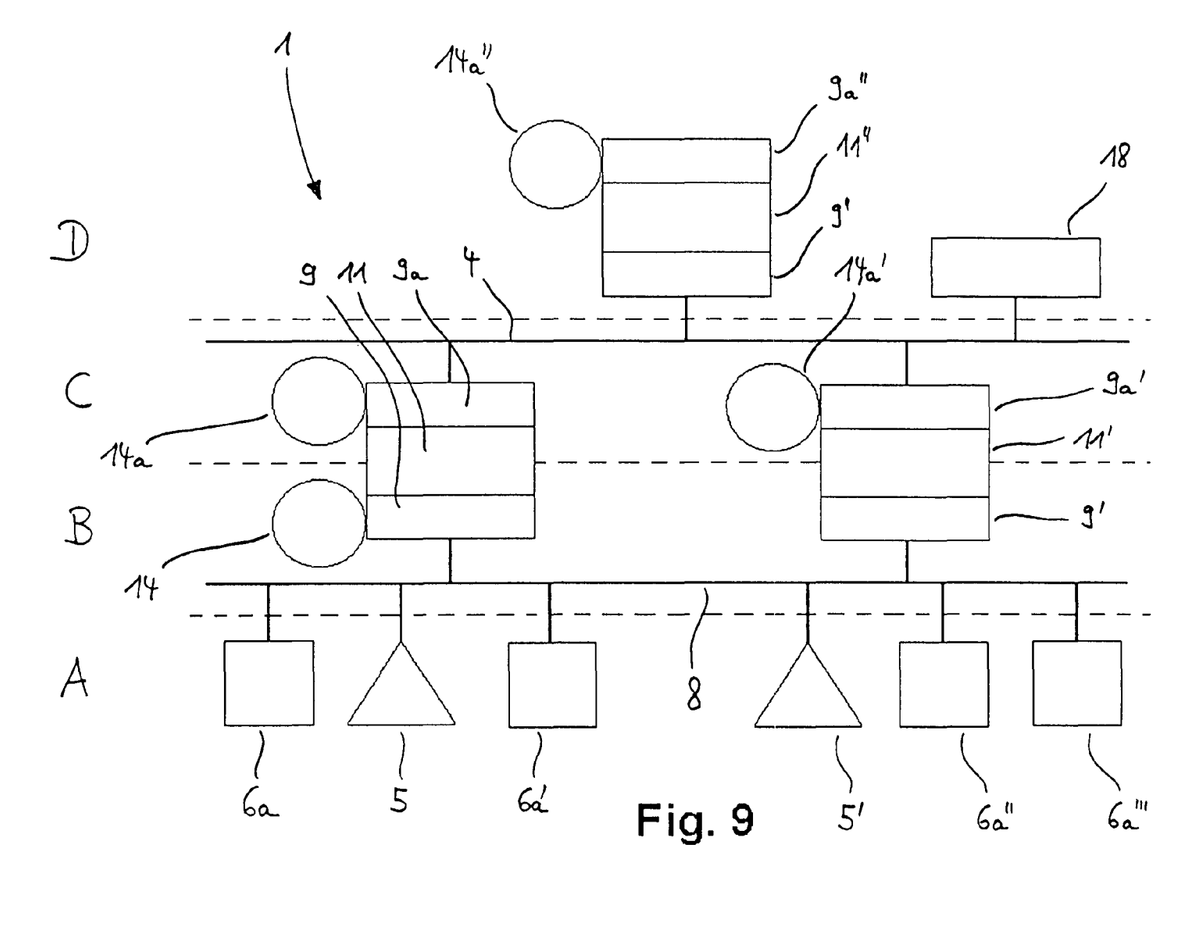

FIG. 9 shows the information pyramids resulting from this principle.

In the embodiment shown, the plant 1 on control plane A has a plurality of field bus PLCs 6a–6a''' and operating devices 5, 5', e.g. industrial robots, which are connected to one another via a field bus system 8 and on plant plane B to real time information servers 9, 9'. The real time information servers 9, 9' form a unit with PLC-VMs 11, 11' and further real time information servers 9a, 9a' located on the line level C.

The information servers 9a, 9a' on line level C are connected by means of a bus system 4 to a further PLC-VM 11" and associated real time information servers 9"', 9a" on area level D. A human-machine interface 18 (HMI) is also connected to the bus 4 on area level D.

Real time data banks 14, 14a, 14a', 14a" for archiving process data (data bank 14) or varyingly compressed characteristic data (data banks 14a, 14', 14a") are inventively associated with a plurality of real time information servers 9, 9a, 9a', 9a". The degree of compression of the data increases with the number of processing steps which take place from control level A via plant level B and line level C to area level D. Thus, through a plurality of cascading, inventive control apparatuses with increasing complexity it is possible to generate and archive process peripheral data, process characteristic data, plane characteristic data, line characteristic data and area characteristic data.

Thus, any desired degree of transparency can be implemented by historical data with adapted resolution. For all departments and sectors of a company dealing with plant control, no matter whether during setting up, maintenance or employee training, there is consequently a uniform language use and use is made of the same tools, data formats, etc., so that it is possible to have a universal link between office and control worlds. This leads to a considerable cost saving by homogenization and leads to a high investment return for the above-described invention.

The invention claimed is:

1. A method for controlling an industrial production plant, having a plurality of working units with controlled plant periphery generating process data during a process run-through, using at least one programmable logic control (PLC), wherein historical process data from an actual earlier process run-through are fed into and processed by the PLC or another PLC program logic in the same way as if said process data had come directly from the plant periphery.

2. The method according to claim 1, wherein feeding-in takes place in cycle-precise manner with respect to a PLC processing cycle.

3. The method according to claim 1, wherein the process data are filed in a real time data bank prior to feeding into the PLC.

4. The method according to claim 1, wherein the process data are generated to at least one field bus of the plant.

5. The method according to claim 1, wherein during their generation, the process data are provided with a time marker.

6. The method according to claim 1, wherein there is a cyclic and/or feed-synchronous processing of the process data by the PLC.

7. The method according to claim 6, wherein processing results are made available in an output area of the PLC.

8. The method according to claim 6, wherein processing results are filed in a real time data bank.

9. The method according to claim 8, wherein a data compression and/or a time coding takes place during filing.

10. The method according to claim 1, wherein a process data stream to the PLC is controlled by means of a data stream controller with respect to data quantity, data rate and time quantity.

11. The method according to claim 1, wherein the process data are fed in online or offline.

12. The method according to claim 1, wherein, as a function of software implemented in the PLC, the method is used for fault finding in the plant or PLC program, for optimizing or simulating production sequences or for synchronous or subsequent characteristic data generation.

13. The method according to claim 1, wherein historical process data and actual process data are combined for feeding into the PLC.

14. The method according to claim 1, wherein at least two programmable logic controls form a virtual machine by cascading connection of their input areas with their output areas, optionally via further data stream control devices.

15. An apparatus for fault finding, optimization, simulation and information exchange in electronically controlled plants the apparatus comprising:
   a plurality of working units with controlled working unit periphery generating process data during a process run-through;
   a real time information server for acquiring, archiving or transferring in each case specific historical process data with respect to the plant; and
   a data stream controller for the flexible transfer of archived process data to at least one programmable logic control for controlling the plant to provide output data that are again feedable into the PLC or some other PLC in the same way as if said output data was process data coming directly from the working unit periphery.

16. The apparatus according to claim 15, wherein the PLC is constructed as a software-based PLC.

17. The apparatus according to claim 15, wherein a real time data bank is provided for archiving process data.

18. The apparatus according to claim 15, wherein the data stream controller is constructed for time-precise location, for time forward and return reproduction, for accelerated and decelerated, as well as quantity-flexible reproduction of historical process data.

19. The apparatus according to claim 15, wherein a process sequence of the plant can be implemented in a time independent manner with a random sequence speed for fault finding, sequence optimization or for training purposes.

20. The apparatus according to claim 16, wherein the historical process data are organized in accordance with their acquisition sequence in a shift register and can be read and processed at any time by an analyzer.

21. The apparatus according to claim 16, wherein the historical process data are provided with a time marker.

22. The apparatus according to claim 21, wherein a visualization unit is provided for process data analysis.

23. The apparatus according to claim 17, wherein specific process data passed on by the real time information server are available for other applications as real time data stream or object linking and embedding (OLE) for process control or analysis.

24. The apparatus according to claim 19, wherein, with respect to its program processing cycle, the PLC is synchronized with the reproduction mode of the data stream controller.

25. The apparatus according to claim 17, wherein there is at least one data acquisition unit in a field bus system of the plant.

26. The apparatus according to claim 25, wherein the data acquisition unit is constructed for buffer storage of I/O data transferred in field bus.

27. The apparatus according to claim 26, wherein the buffer store is a shift register.

28. The apparatus according to claim 25, wherein the data acquisition unit is connected by means of a local area network (LAN) to the real time information server.

29. The apparatus according to claim 17, wherein at least the PLC and/or the real time information server are constructed as software components of a personal computer (PC).

30. The apparatus according to claim 15, wherein a virtual machine is obtained by cascading connection of at least two programmable controls via their input and output areas, optionally via further data stream control devices.

* * * * *